US010704674B2

(12) United States Patent
Mochizuki et al.

(10) Patent No.: US 10,704,674 B2
(45) Date of Patent: Jul. 7, 2020

(54) SHIFT DEVICE

(71) Applicant: KABUSHIKI KAISHA TOKAI-RIKA-DENKI-SEISAKUSHO, Aichi-ken (JP)

(72) Inventors: Shuichi Mochizuki, Aichi-ken (JP); Munetoshi Makimura, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 226 days.

(21) Appl. No.: 15/845,476

(22) Filed: Dec. 18, 2017

(65) Prior Publication Data
US 2018/0180171 A1 Jun. 28, 2018

(30) Foreign Application Priority Data

Dec. 26, 2016 (JP) ................. 2016-251700

(51) Int. Cl.
*F16H 59/08* (2006.01)
*F16H 59/54* (2006.01)
*F16H 61/18* (2006.01)
*F16H 61/22* (2006.01)

(52) U.S. Cl.
CPC ............. *F16H 59/08* (2013.01); *F16H 59/54* (2013.01); *F16H 61/18* (2013.01); *F16H 2059/081* (2013.01); *F16H 2061/223* (2013.01)

(58) Field of Classification Search
CPC ............... F16H 2059/081; F16H 61/22; F16H 2061/223; F16H 63/3425; F16H 63/3416
See application file for complete search history.

(56) References Cited

U.S. PATENT DOCUMENTS

| 6,564,661 | B2 * | 5/2003 | DeJonge | B60K 37/06 74/335 |
| 7,571,662 | B2 * | 8/2009 | Pickering | B60K 37/06 74/473.3 |
| 9,122,300 | B2 * | 9/2015 | Oosawa | G05G 1/10 |
| 9,212,740 | B2 * | 12/2015 | Watanabe | F16H 59/08 |
| 9,334,949 | B2 * | 5/2016 | Fett | F16H 59/08 |
| 9,620,309 | B2 | 4/2017 | Hoskins et al. | |
| 2009/0000407 | A1 * | 1/2009 | Meyer | B60K 37/06 74/10.1 |
| 2010/0307276 | A1 * | 12/2010 | Giefer | F16H 59/10 74/473.3 |
| 2014/0007726 | A1 * | 1/2014 | Muraki | F16H 59/08 74/473.3 |
| 2015/0027861 | A1 * | 1/2015 | Hoskins | F16H 59/08 200/43.11 |

(Continued)

FOREIGN PATENT DOCUMENTS

| JP | 2016-094082 A | 5/2016 |
| WO | 2015055369 A1 | 4/2015 |

*Primary Examiner* — William Kelleher
*Assistant Examiner* — Gregory T Prather
(74) *Attorney, Agent, or Firm* — Roberts Calderon Safran & Cole P.C.

(57) ABSTRACT

When a lock bar is moved in a state in which a cam is rotated and an abutting face is abutted on a cam face of the cam, the abutting face is abutted on a circumferential face of the cam at a location excluding a lock bar moving direction position with respect to a center of rotation. Accordingly, a movement stroke of the lock bar with respect to a rotation angle of the cam can be increased.

3 Claims, 3 Drawing Sheets

(56) References Cited

U.S. PATENT DOCUMENTS

| | | | |
|---|---|---|---|
| 2015/0369358 A1* | 12/2015 | Lee | F16H 59/08 |
| | | | 74/507 |
| 2016/0138704 A1* | 5/2016 | Watanabe | F16H 59/08 |
| | | | 74/473.23 |
| 2016/0238128 A1 | 8/2016 | Rake et al. | |
| 2016/0245403 A1* | 8/2016 | Rake | F16H 61/22 |
| 2017/0074391 A1* | 3/2017 | Tebbe | F16H 59/08 |
| 2017/0175884 A1* | 6/2017 | Watanabe | F16H 59/08 |
| 2018/0038478 A1* | 2/2018 | Arakawa | B60K 20/02 |
| 2018/0180176 A1* | 6/2018 | Mochizuki | F16H 59/08 |
| 2019/0203831 A1* | 7/2019 | Beattie | F16H 59/08 |
| 2019/0211921 A1* | 7/2019 | Watanabe | F16H 59/08 |

\* cited by examiner

SHIFT DEVICE

CROSS-REFERENCE TO RELATED APPLICATION

This application claims priority under 35 USC 119 from Japanese Patent Application No. 2016-251700 filed Dec. 26, 2016, the disclosure of which is incorporated by reference herein.

BACKGROUND

Field of the Invention

The present disclosure relates to a shift device in which a rotation body is rotated to change a shift position.

Related Art

In the shift device described in Japanese Patent Application Laid-Open (JP-A) No. 2016-094082, when a knob is disposed in a P position and a brake operation is not being applied, a rotor cam is rotated in one direction and a lock bar is rotated in a lock direction such that a leading end portion of the lock bar is inserted into a recess in the knob to lock rotation of the knob. When the knob is disposed in the P position and the brake operation is applied, the rotor cam is rotated in another direction and the lock bar is rotated in a lock release direction, thereby releasing rotation restriction on the knob.

In the shift device, if the cam is used in moving the lock bar, it is preferable that the movement stroke of a movement member with respect to a rotation angle of the cam can be made large.

SUMMARY

A shift device is provided that is capable of making a large movement stroke of a movement member with respect to a rotation angle of a cam member.

A shift device of a first aspect includes: a rotation body that is rotatable to change a shift position; a movement member that is configured to be moved to one side to restrict rotation of the rotation body, and to be moved to another side to release restriction of rotation of the rotation body; and a cam member that is rotatable, that is provided with a cam face, and that is configured to be rotated in one direction or another direction, such that the movement member is moved toward the one side or the another side in a state in which the movement member is abutted on the cam face at a location that excludes a position at which a line extending from a center of rotation of the cam member (the cam face) in a moving direction of the movement member intersects with the cam face.

In the shift device of the first aspect, the rotation body is rotated to change the shift position. Further, in the state in which the movement member is abutted on the cam face of the cam member, the cam member is rotated in the one direction or the another direction such that the movement member is moved toward the one side or the another side. Rotation of the rotation body is thereby restricted or restriction is released.

Note that the cam member is rotated in the state in which the movement member is abutted on the cam face at the location excluding the position at which the line extending from the center of rotation of the cam member in the moving direction of the movement member intersects with the cam face, such that the movement member is moved. Thus, the movement stroke, arising from rotation of the cam member, of a portion of the cam member that abuts the movement member can be made large in the movement member movement direction, enabling a large movement stroke of the movement member with respect to the rotation angle of the cam member.

The shift device of a second aspect is the shift device of the first aspect, wherein, in a state in which the movement member is abutted on the cam face at a location including a position at which a line extending from the center of rotation of the cam member in a direction perpendicular to the moving direction of the movement member intersects with the cam face, the cam member is configured to be rotated in the one direction or the another direction such that the movement member is moved toward the one side or the another side.

In the shift device of the second aspect, when the cam member is rotated in the one direction or the another direction such that the movement member is moved toward the one side or the another side, the movement member is abutted on the cam face at the location including the position at which the line extending from the center of rotation of the cam member in the direction perpendicular to the moving direction of the movement member intersects with the cam face. This enables the movement stroke, arising from rotation of the cam member, of a portion of the cam member that abuts the movement member to be efficiently made large in the movement member movement direction, enabling the movement stroke of the movement member to be efficiently made large with respect to the rotation angle of the cam member.

The shift device of a third aspect is the shift device of the first aspect or the second aspect, wherein an abutting face of the movement member, which is abutted on the cam face, is inclined with respect to the moving direction of the movement member and with respect to the direction perpendicular to the moving direction of the movement member.

The shift device of a fourth aspect is the shift device of the third aspect, wherein the abutting face is inclined in a direction so as to being away from the center of rotation of the cam member in the direction perpendicular to the moving direction of the movement member on progress toward a side of the rotation body in the moving direction of the movement member.

The shift device of the first aspect has the excellent advantageous effect of being able to make the movement stroke of the movement member larger with respect to the rotation angle of the cam member.

The shift device of the second aspect has the excellent advantageous effect of being able to efficiently make the movement stroke of the movement member larger with respect to the rotation angle of the cam member. The shift device of the third and fourth aspects has the excellent advantageous effect of being able to make the movement stroke of the movement member even larger with respect to the rotation angle of the cam member.

BRIEF DESCRIPTION OF THE DRAWINGS

An exemplary embodiments will be described in detail with reference to the following figures, wherein.

DETAILED DESCRIPTION

Figure 1:
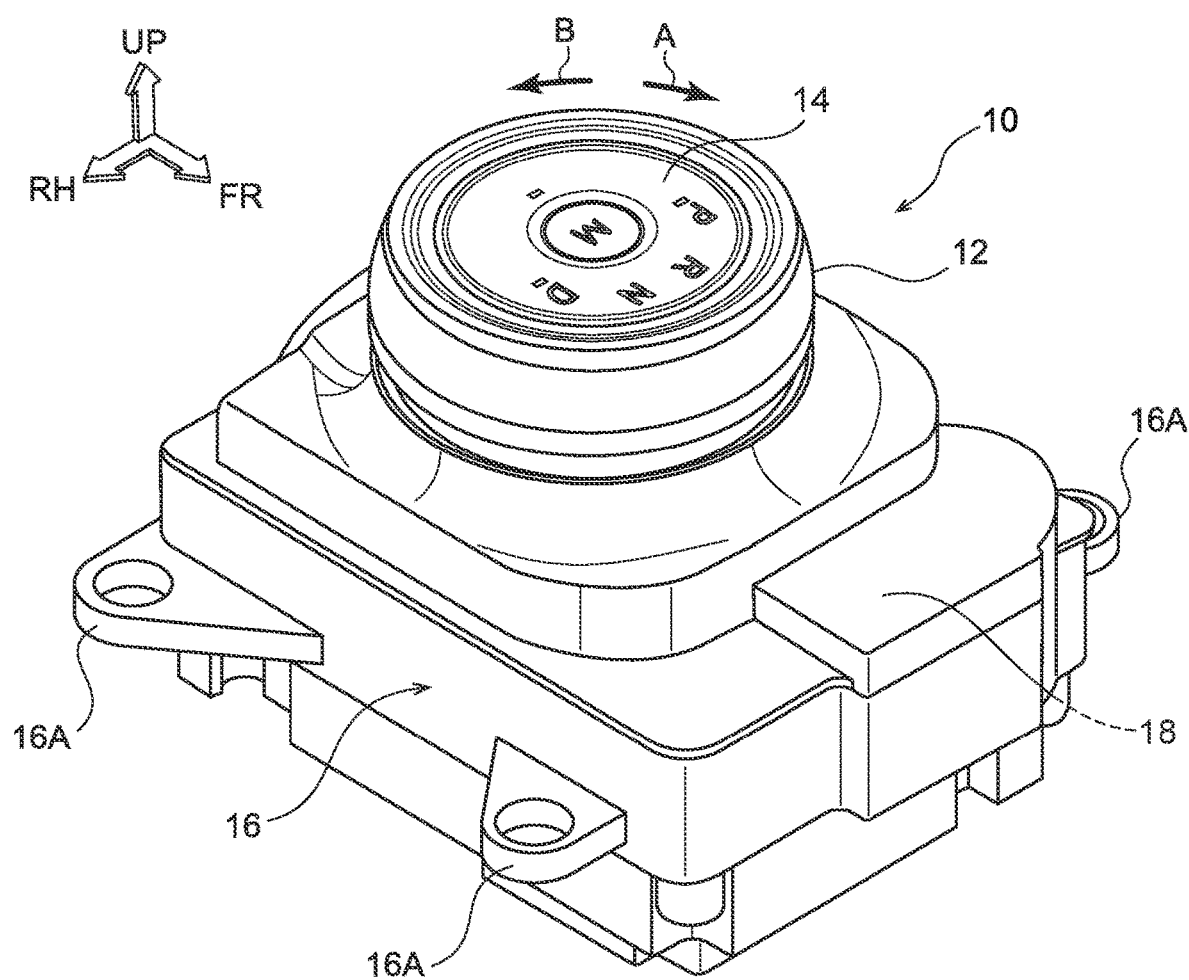
FIG. 1 is a perspective view illustrating a shift device according to an exemplary embodiment.

Detailed explanation follows regarding an exemplary embodiment, with reference to the drawings. FIG. 1 is a perspective view illustrating a shift device 10 according to the present exemplary embodiment, as viewed from an upper side. Note that in the drawings, the arrow FR indicates the front of the shift device 10, the arrow RH indicates the right of the shift device 10, and the arrow UP indicates the upper side of the shift device 10.

The shift device 10 according to the present exemplary embodiment is what is referred to as a by-wire type shift device. The shift device 10 is installed to an instrument panel of a vehicle (automobile), and is disposed at the vehicle front side and vehicle width direction inside of a driving seat in the vehicle (not illustrated in the drawings). The front, right, and upper side of the shift device 10 respectively face obliquely toward the upper front, right, and obliquely toward the upper rear of the vehicle.

The shift device 10 is provided with a knob base 16 that is formed in a box shape. A knob 12, described later, a knob support section 14 that rotatably supports the knob 12, and the like are attached to the knob base 16. The knob base 16 is provided with plural insertion portions 16A into which bolts, not illustrated in the drawings, are inserted. The bolts inserted into the insertion portions 16A are screwed into a shift device fixing section disposed within the instrument panel such that the shift device 10 is fixed to the shift device fixing section. Note that in a state in which the shift device 10 is fixed to the shift device fixing section, the knob 12 projects into the vehicle cabin through an opening formed in the instrument panel.

The substantially cylindrical knob 12, serving as a rotation body, is supported by the knob base 16 so as to be rotatable about (via) the knob support section 14, and the knob 12 is capable of being rotation-operated by an occupant of the vehicle (a driver seated on the driving seat in particular). The knob 12 is capable of rotating in one direction (the arrow A direction) and in another direction (the arrow B direction) within a predetermined range (predetermined angular range). The shift position of the knob 12 is changed by rotating the knob 12 in the one direction or the another direction. In the present exemplary embodiment, the knob 12 is capable of being disposed at a P position (parking position) serving as a predetermined shift position, an R position (reverse position), an N position (neutral position), and a D position (drive position), on progression from the another direction side toward the one direction side.

A shift sensor (not illustrated in the drawings), serving as a shift detection unit, is provided within the knob base 16, and the shift sensor detects the rotation position of a magnet (not illustrated in the drawings) provided at the knob 12 to detect the shift position of the knob 12. The shift sensor is electrically connected to a control device of the vehicle (not illustrated in the drawings).

Moreover, a detection unit for detecting whether or not a brake, serving as a braking section of the vehicle, is being operated (applied) by the occupant is electrically connected to the control device. The vehicle is braked when the occupant operating (applying) the brake.

Figure 2:
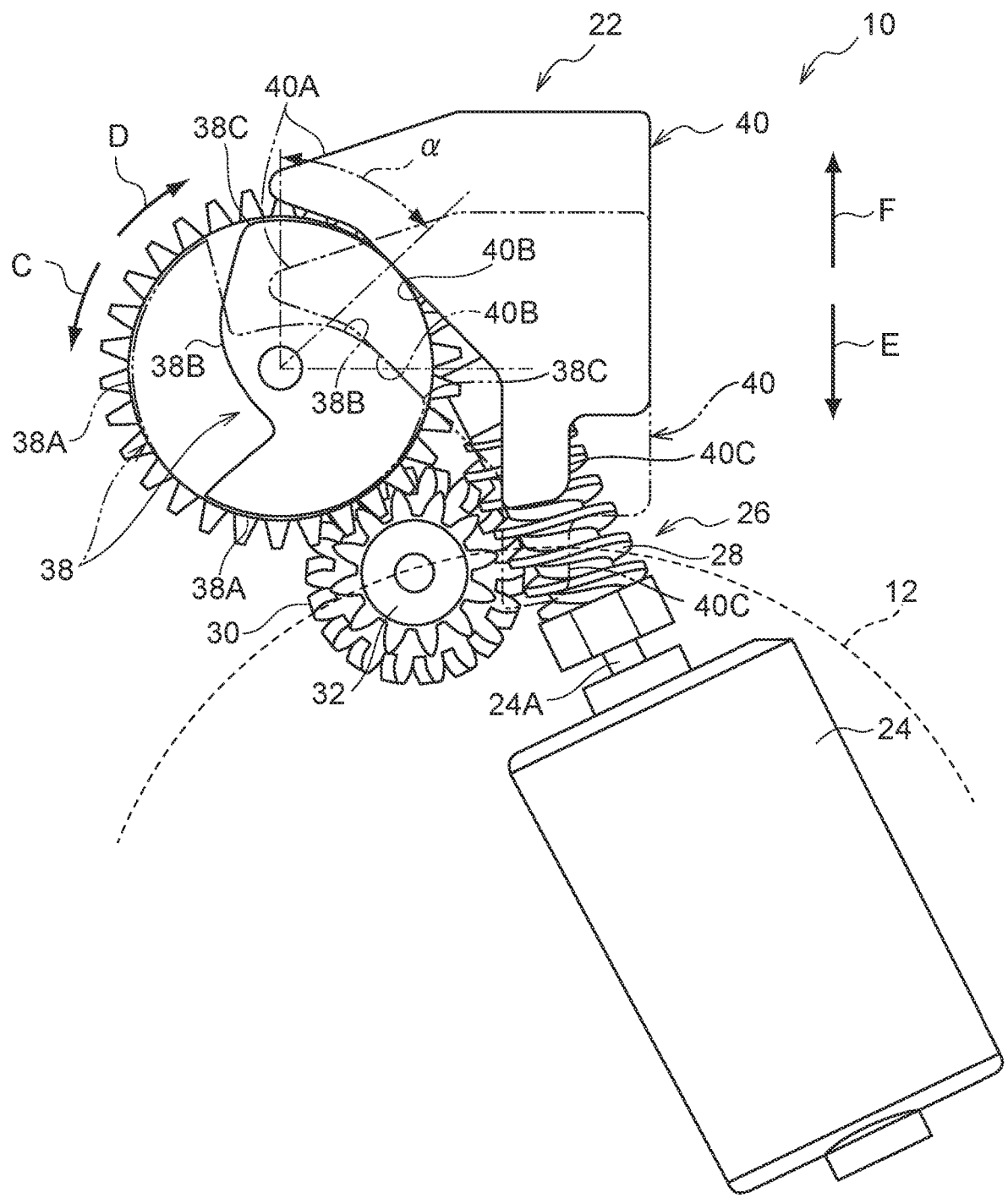
FIG. 2 is a plan view illustrating relevant portions of a shift device.
Figure 3:
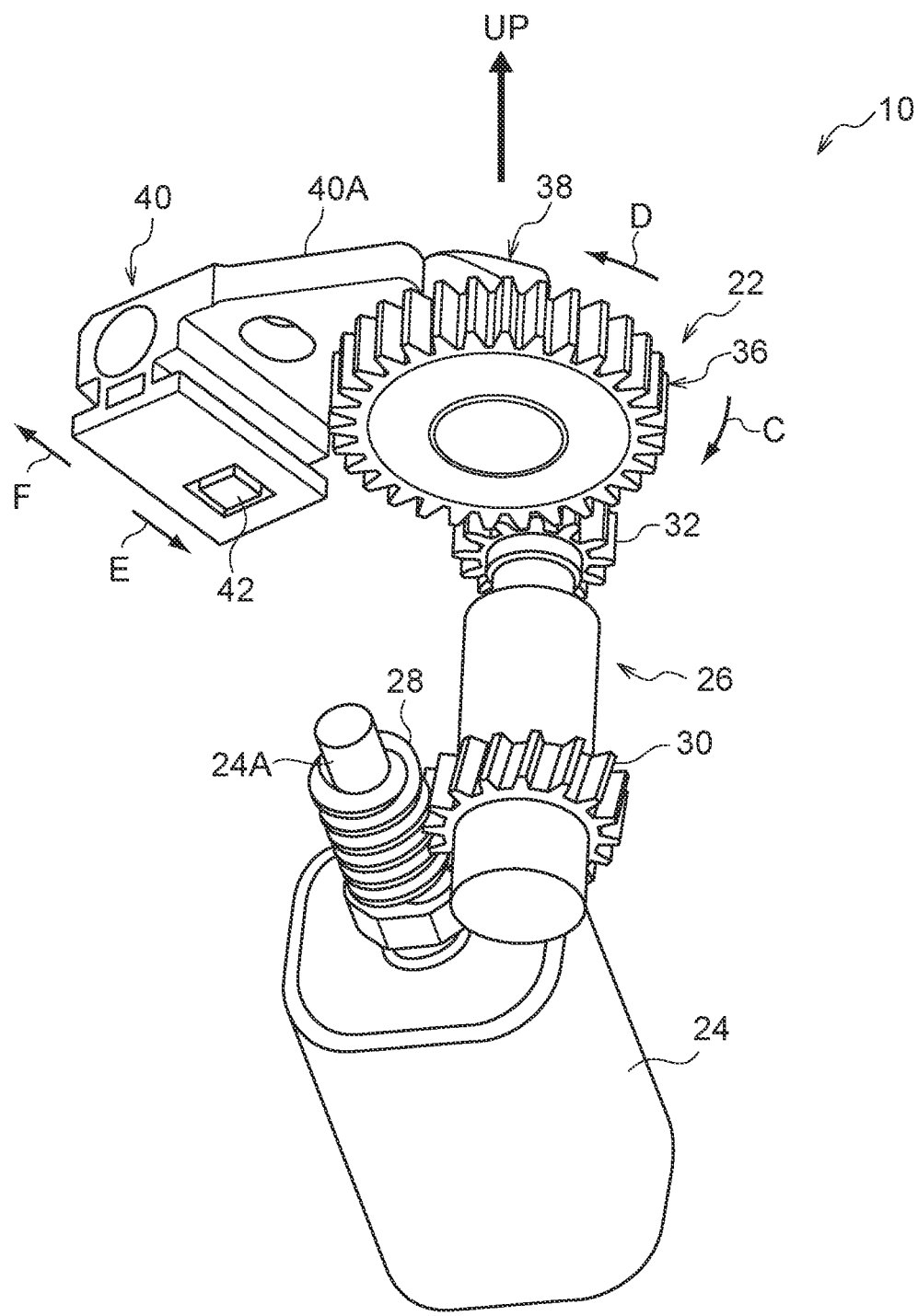
FIG. 3 is a perspective view illustrating restriction portion of a shift device.

Next, explanation follows regarding a shift lock mechanism 22. FIG. 2 illustrates the shift lock mechanism 22 in plan view. FIG. 3 illustrates the shift lock mechanism 22 in perspective view, as viewed obliquely from below.

The shift lock mechanism 22 is configured including a motor 24, serving as a drive unit, and a transmission mechanism 26 for transmitting drive force from the motor 24. A direct current motor that includes a rotation shaft 24A that is rotated by passing current through is used for the motor 24, and the motor 24 is electrically connected to the control device. The motor 24 is disposed at a lower side of the knob 12 and the knob support section 14 (see FIG. 1) (one side in rotation axial direction of the knob 12 with respect to the knob 12) in a state in which the axial direction of the rotation shaft 24A is at a right angle to the rotation axial direction of the knob 12. Further, the motor 24 is controlled by the control device such that the rotation shaft 24A rotates in a forward rotation direction and a reverse rotation direction.

The transmission mechanism 26 is configured including a worm gear 28 provided at the rotation shaft 24A of the motor 24, a helical gear 30 that meshes with the worm gear 28, and an intermediate gear 32 that rotates integrally with (as a unit with) the helical gear 30. Rotation of the rotation shaft 24A of the motor 24 is transmitted to the intermediate gear 32 through the worm gear 28 and the helical gear 30, thereby rotating the intermediate gear 32.

A lock gear 36, this being a spur gear serving as a rotation member, is provided at the shift lock mechanism 22. The lock gear 36 is configured larger in diameter than the intermediate gear 32, and meshes with the intermediate gear 32. The lock gear 36 is thus rotated in a lock direction (arrow D direction) or a lock release direction (arrow C direction) by rotating the intermediate gear 32.

At an upper face of the lock gear 36, a cam 38 serving as a cam member (a restriction member and restriction release member) is provided. The cam 38 rotates integrally with (as a unit with) the lock gear 36. The cam 38 projects from the upper face of the lock gear 36 toward the upper side, and a cam face 38A and a cam face 38B are formed on an outer circumference of the cam 38. The diameter dimension of the cam face 38A is substantially constant and slightly smaller than the diameter dimension of a tooth bottom face of the lock gear 36. The cam face 38A is formed spanning substantially half the circumference of the cam 38. An inflection point 38C is provided on the lock release direction side of the cam face 38A. The cam face 38B is continuous to the inflection point 38C in the lock release direction, and the diameter dimension of the cam face 38B decreases on progression away from the inflection point 38C in the lock release direction.

A block shaped lock bar 40, serving as a movement member, is provided at the shift lock mechanism 22. A length direction of the lock bar 40 is configured substantially in a radial direction of the knob 12 (a rotation restriction direction and a restriction release direction which will be mentioned later), and the lock lever 40 is supported, at the upper side of the lock gear 36, by the knob base 16 so as to be capable of moving substantially toward a radial inside of the knob 12 (in the rotation restriction direction, arrow E direction) and substantially toward a radial outside of the knob 12 (in the restriction release direction, arrow F direction). A substantially triangular slide projection 40A is integrally provided to the lock bar 40. The slide projection 40A projects from a base portion of the lock bar 40, and faces a circumferential face of the cam 38 (the cam faces 38A and 38B) on the opposite side to the knob 12. An abutting face 40B, serving as an abutting face, is provided to the slide projection 40A on the cam 38 side.

The abutting face 40B of the lock bar 40 is inclined in a direction toward the opposite side to the cam 38 on progression toward the knob 12 side (the abutting face 40B is inclined with respect to the rotation restriction direction and the restriction release direction of the lock bar 40, and is inclined with respect to a direction orthogonal to the rotation restriction direction and the restriction release direction) when viewed in an axis direction of rotation of the knob 12 (an axis direction of rotation of the lock gear 36 (the cam 38)) such as shown in FIG. 2, in details, the abutting face 40B of the lock bar 40 is inclined in a direction so as to being away from a center of rotation of the cam 38 (the cam faces 38A and 38B) in the direction orthogonal to a moving direction (the rotation restriction direction and the restriction release direction) of the lock bar 40 on progress toward the knob 12 side (rotation center side of the knob 12) in the moving direction of the lock bar 40. Accordingly, when (in a state in which) the abutting face 40B is abutting on the cam face 38A, the abutting face 40B is abutted at a position of the cam face 38A, which is offset by an angle α toward the lock bar 40 side (in the lock direction (arrow D direction)), with respect to an arrow F direction position with respect to the rotation center of the cam 38, namely, with respect to a position of the cam face 38A at which an imaginary line extending from the rotation center of the cam 38 in the arrow F direction (the restriction release direction) intersects. In other words, when viewed in the axis direction of rotation of the cam 38 such as shown in FIG. 2, an angle formed by the imaginary line extending from the rotation center of the cam 38 in the arrow F direction (the restriction release direction) and an imaginary line connecting the rotation center of the cam 38 and a position at which the cam face 38A and the abutting face 40B contact, is the angle α. Note that in the present exemplary embodiment, the angle α is set within a range of 0<α<π/2 (radian).

A coil spring (compression spring, not illustrated in the drawings), serving as an urging unit, is provided on the opposite side of the lock bar 40 to the knob 12. The lock bar 40 is urged substantially toward the radial inside of the knob 12 (in the arrow E direction) by the coil spring, and the abutting face 40B of the slide projection 40A is abutted by the circumferential face (cam face 38A) of the cam 38.

Further, a rectangular column shaped lock projection 40C, serving as a restriction portion, is integrally provided to the lock bar 40. The lock projection 40C projects from the base portion of the lock bar 40 substantially toward the radial inside (in the arrow E direction) of the knob 12. In an engagement state of the lock bar 40 in which the abutting face 40B of the slide projection 40A is abutted the cam face 38A of the cam 38 (the state illustrated by solid lines in FIG. 2), the lock projection 40C is separated from the knob 12 against the urging force from the coil spring. When the cam 38 is rotated in the lock direction integrally with (as a unit with) the lock gear 36 and the abutting face 40B of the slide projection 40A is abutted the cam face 38B from the inflection point 38C of the cam 38, the lock bar 40 transitions to an engagement-released state (the state illustrated by double-dotted dashed lines in FIG. 2), and the lock projection 40C moves in the rotation restriction direction of the knob 12 (arrow E direction) under the urging force from the coil spring. A lock hole (not illustrated in the drawings) is formed at an outer circumferential portion at a lower end portion of the knob 12 (see FIG. 1). In the engagement-released state of the lock bar 40, the lock projection 40C enters the lock hole of the knob 12, and the lock bar 40 (lock projection 40C) thereby restricts the knob 12 from rotating.

Note that as illustrated in FIG. 3, a magnet 42, serving as a detection section, is provided at a lower-side face of the base portion of the lock bar 40. A sensor substrate, not illustrated in the drawings, faces the magnet 42, and the sensor substrate is electrically connected to the control device. The position of the lock bar 40 is thereby detected by the control device.

Next, explanation follows regarding operation of the present exemplary embodiment. In the shift device 10 described above, in a case in which the knob 12 is disposed at a P position (in a case in which the shift sensor has detected that the shift position of the knob 12 is the P position) and the brake is not being operated (applied), in the shift lock mechanism 22, the motor 24 is driven under the control of the control device so as to rotate in reverse, such that the lock gear 36 is rotated in the arrow D direction through the worm gear 28, the helical gear 30, and the intermediate gear 32, and the cam 38 is rotated in the engagement-released direction (in a direction to release the engagement with the lock bar 40) (the arrow D direction). Thus, when the cam face 38B of the cam 38 faces the abutting face 40B of the lock bar 40, the lock bar 40 moves toward substantially the radial inside of the knob 12 (in the arrow E direction) under the urging force from the coil spring, so the lock bar 40 is made to be the engagement-released state, duethereto, the lock projection 40C enters the lock hole of the knob 12, thereby restricting the knob 12 from rotating. Note that when the lock bar 40 is in the engagement-released state (when the lock projection 40C is detected as having entered the lock hole), driving of the motor 24 so as to rotate in reverse is stopped under the control of the control device.

On the other hand, in a case in which the knob 12 is disposed at the P position and the brake is being operated (applied), in the shift lock mechanism 22, the motor 24 is driven so as to rotate forward under the control of the control device, thereby rotating the lock gear 36 in the arrow C direction through the worm gear 28, the helical gear 30, and the intermediate gear 32, and thereby rotating the cam 38 in the engagement state direction (in a direction to engage with the lock bar 40) (the arrow C direction). Thus, when the cam face 38A of the cam 38 faces the abutting face 40B of the lock bar 40, the lock bar 40 moves substantially toward the radial outside of the knob 12 (in the arrow F direction) against the urging force of the coil spring, so the lock bar 40 is made to be the engagement state, duethereto, the lock projection 40C is accordingly pulled out from the lock hole of the knob 12, releasing the rotation restriction on the knob 12. Note that when the lock bar 40 is in the engagement state (when the lock projection 40C is detected as having been pulled out from the lock hole), the driving of the motor 24 so as to rotate forward is stopped under the control of the control device.

When the cam 38 is rotated and the lock bar 40 is moved, when viewed in the axis direction of rotation of the cam 38, the abutting face 40B abuts the cam 38 such that the abutting face 40B is abutted at position of the cam faces 38A and 38B (including the inflection point 38C) excluding arrow F direction position with respect to the rotation center and arrow E direction position with respect to the rotation center, namely, excluding positions at which the imaginary line extending from the rotation center of the cam 38 in the arrow F direction (the restriction release direction) and an imaginary line extending from the rotation center of the cam 38 in the arrow E direction (the restriction direction) intersects with the cam 38 (cam face). This enables a larger movement stroke of the portion of the circumferential face of the cam 38 that abuts the abutting face 40B of the lock bar 40 in the movement direction (the restriction release direction and the restriction direction) of the lock bar 40 due to the cam 38 being rotated, and enables a larger movement stroke of the lock bar 40 with respect to the rotation angle of the cam 38.

The movement stroke of the lock bar 40 with respect to the rotation angle of the cam 38 can thus be increased in the shift lock mechanism 22, enabling the lock bar 40 to move to a position restricting the knob 12 from rotating and a position releasing the restriction, even if the rotation angle of the cam 38 is small.

Further, the movement speed of the lock bar 40 becomes faster as a result of the movement stroke of the lock bar 40 with respect to the rotation angle of the cam 38 being large. In the shift lock mechanism 22, the lock projection 40C of the lock bar 40 can accordingly be inserted into and removed from the lock hole of the knob 12 quickly. Moreover, since the cam 38 can be set with a small rotation angle between the engagement-released state and the engagement state of the lock bar 40, a region (angular range) of the cam 38 for moving the lock bar 40 can be narrowed.

Moreover, when the lock bar 40 moves in the range between the position restricting the knob 12 from rotating and the position releasing the restriction, the abutting face 40B abuts the cam face 38B (may also be the inflection point 38C) at a lock bar 40 moving direction perpendicular direction position with respect to the rotation center of the cam 38, namely, at a position at which an imaginary line extending from the rotation center of the cam 38 in a direction perpendicular to the movement direction (the restriction release direction and the restriction direction) of the lock bar 40 (FIG. 2). Since the movement stroke in the movement direction of the portion of the circumferential face of the cam 38 that abuts the abutting face 40B in the movement direction due to the cam 38 being rotated is efficiently increased, the movement stroke of the lock bar 40 with respect to the rotation angle of the cam 38 can also be efficiently increased.

Note that the abutting face 40B of the lock bar 40 may be inclined toward the cam 38 side on progression toward the knob 12 side (in this case, an inclining direction of the abutting face 40B is different from that of the abutting face 40B shown in FIG. 2, but other structures of this case are the substantially the same as those shown in FIG. 2). Thus, when the lock bar is moved (when moved in the restriction direction or the restriction release direction), an abutted position (relative abutted position) on the abutting face 40B in the movement direction of the lock bar 40 where the abutting face 40B abuts the cam face 38B (including the inflection point 38C) is displaced to the opposite side to the movement direction (moving side) of the lock bar 40 (when the lock bar 40 is moved in the arrow E direction, the abutted position is moved from P1 to P2, namely, the abutted position on the abutting face 40B in the movement direction of the lock bar 40 is displaced in the arrow F direction). Accordingly, the lock bar 40 moves in the movement direction due to the displacement of the position where the abutting face 40B contacts the cam face 38B, enabling the movement stroke of the lock bar 40 with respect to the rotation angle of the cam 38 to be increased even more.

Moreover, in the present exemplary embodiment, explanation has been given of an example in which the shift device 10 is provided at the instrument panel of the vehicle. However, there is no limitation thereto. The shift device may be provided at the floor of the vehicle, or may be provided at the column (steering column) of the vehicle.

What is claimed is:

1. A shift device comprising:
a rotation body that is rotatable to change a shift position;
a movement member that is configured to be moved to one side in a moving direction of the movement member to restrict rotation of the rotation body, and to be moved to another side in the moving direction to release restriction of rotation of the rotation body, the moving direction being a direction perpendicular to an axis of rotation of the rotation body; and
a cam member that is rotatable about an axis different from the axis of rotation of the rotation body, that is provided with a cam face, and that is configured to be rotated in one direction or another direction, such that the movement member is moved toward the one side or the another side in a state in which the movement member is abutted on the cam face at a location that excludes a position at which a line extending from a center of rotation of the cam member in the moving direction of the movement member intersects with the cam face,
wherein, in a state in which the movement member is abutted on the cam face at a location including a position at which a line extending from the center of rotation of the cam member in a direction perpendicular to the moving direction intersects with the cam face, the cam member is configured to be rotated in the one direction or the another direction such that the movement member is moved toward the one side or the another side.

2. The shift device of claim 1, wherein an abutting face of the movement member, which is abutted on the cam face, is inclined with respect to the moving direction of the movement member and with respect to a direction perpendicular to the moving direction of the movement member.

3. The shift device of claim 2, wherein the abutting face is inclined in a direction so as to being away from a center of rotation of the cam member in the direction perpendicular to the moving direction of the movement member on progress toward a side of the rotation body in the moving direction of the movement member.

* * * * *